B. A. AFZELIUS.
BELT CONVEYER.
APPLICATION FILED JUNE 4, 1912.
1,055,591. Patented Mar. 11, 1913.
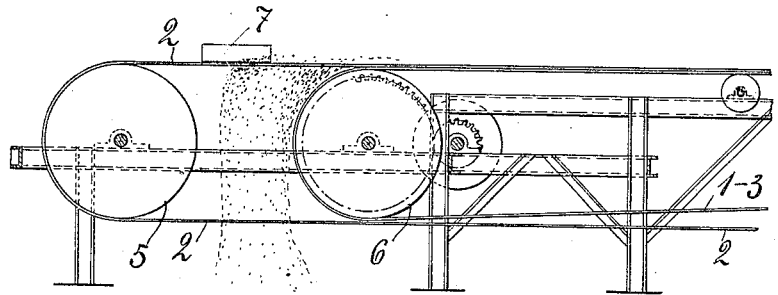
Fig. 1.
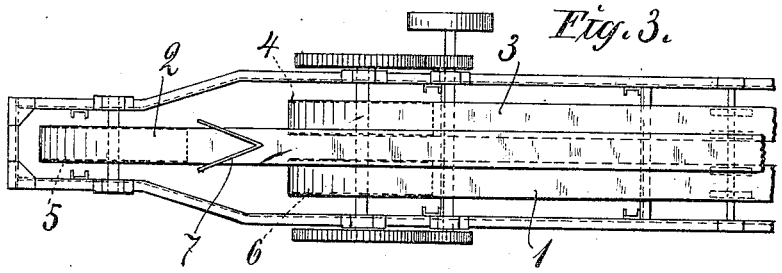
Fig. 3.
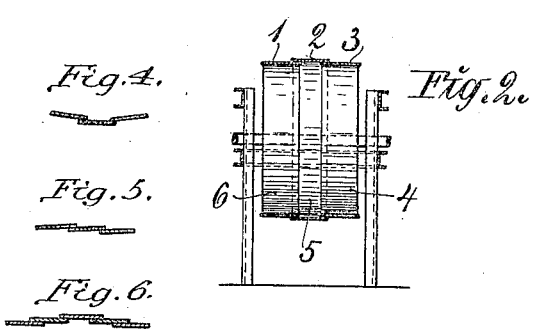
Witnesses:—
Hyperion Barry.
F. George Barry.
Inventor:
Bengt A. Afzelius
by his attorney
Browns Ferrard

UNITED STATES PATENT OFFICE.

BENGT ADAM AFZELIUS, OF SANDVIKEN, SWEDEN, ASSIGNOR TO SANDVIKENS JERN-VERKS AKTIEBOLAG, OF SANDVIKEN, SWEDEN, A CORPORATION OF SWEDEN.

BELT CONVEYER.

1,055,591.  Specification of Letters Patent.   Patented Mar. 11, 1913.

Application filed June 4, 1912. Serial No. 701,547.

*To all whom it may concern:*

Be it known that I, BENGT ADAM AFZELIUS, a subject of the King of Sweden, and resident of Sandviken, in the Kingdom of Sweden, have invented certain new and useful Improvements in Belt Conveyers, of which the following is a specification, reference being had therein to the accompanying drawing.

Conveyers for sawdust, coal, ore and other substances, which consist of an endless belt made of leather and india-rubber as is common, are short lived because of the destructible nature of the material of which they are made. Metallic belts (steel belts) are very durable, but metallic belts made in one piece by rolling, cannot, at present, be manufactured satisfactorily with a width greater than about 400 millimeters, and furthermore, their cost rapidly increases with their width.

The object of this invention is to remove the said drawback, by using two or more sheet metal belts located side by side and overlapping each other at their edges. The said belts form together in cross section a horizontal, flat or substantially flat, surface, which supports the goods in a manner as reliable as a single belt and without the goods being able to pass through the joints. In this manner the conveyer belt may be made with the desired width so that the belts, mounted edgewise or in a slanting position, which are commonly used to form the side walls of the trough, can be dispensed with, and the complications arising from their use avoided:

In the accompanying drawings, one end of the conveying device in question is shown in a side view in Figure 1, in cross section in Fig. 2 and in a plan view in Fig. 3. Figs. 4, 5, 6 are cross sections of the conveyer showing different arrangements of the belt elements, and Figs. 7 and 8 are partial edge views showing the connection of longitudinal sections.

The conveying device consists of three belts 1, 2 and 3. The central belt 2 overlaps the side belts 1 and 3. For facilitating the tightening of the belts to the necessary degree, special guide rolls 4, 5, 6, may be provided, one for each of the belts at one end or both the ends of the conveying device. For supporting the parts of the conveyer at other points, rolls or any other suitable means may be used. The belts which compose the conveyer are parallel, the overlapping edges of adjacent parts being in close contact. The top side of the composed belt may, however, be somewhat concave, as shown in Fig. 4. The belts may also be so mounted that the central belt is located with one of its edges under one of the adjacent belts and with its other edge over the second adjacent belt, as shown in Fig. 5. The same order may be observed when three, four or more belts are used. If more than three belts are used, for instance five, they may also be arranged as shown in Fig. 6, the central belt overlapping each adjacent belt, and the said adjacent belts each overlapping the belt adjacent to it. The location of the belts is determined by the manner in which the goods are discharged from the conveyer belt. For instance, if the goods are divided into two parts, discharged at each side of the conveyer by a >-shaped scraper 7, Fig. 2, the central belt must be located uppermost at both its edges, and the belts located at the same side of the central belt must be so mounted that each of them is located with its outer edge over the next belt. If all the goods are to be discharged at the one side of the conveyer, each consecutive belt must be located with one edge over the adjacent belt in the direction in which the goods are moved from the belt, as in Fig. 5, so that no one of the edges can prevent the goods from being discharged and the goods cannot be retained on a belt between the edges of belts adjacent thereto. Also when two belts are used, they are arranged with their adjacent edges overlapping, as in Fig. 5. Owing to the fact that the composed belt has a great width and, consequently, side belts of known form located edgewise may be dispensed with, the present structure has the advantage of permitting the material being conveyed to be discharged from the conveyer at any desired point by scraping it sidewise without lifting it from the conveyer.

The belt may be made in two or more pieces longitudinally, connected by means of rivets, as in Fig. 7, or hinges as in Fig. 8, or other well known or approved means.

Having now described my invention,

What I claim as new and desire to secure by Letters Patent is:

1. An endless conveyer composed of parallel belts, each made of flexible, rolled sheet metal, which belts are located side by side and overlap each other at the adjacent edges, substantially as described and for the purpose set forth.

2. An endless conveyer composed of parallel belts, each made of flexible, rolled sheet metal, which belts are located side by side and fit tightly to each other by overlapping each other at the adjacent edges, the belts bearing with their sides against the sides of the adjacent belts, substantially as described and for the purpose set forth.

3. In an endless conveyer the combination of parallel belts for the transporting of the goods, which belts, each made of flexible rolled sheet metal, are located side by side and fit tightly to each other by overlapping each other, and belt pulleys, with substantially horizontal shafts and carrying the belts, the said pulleys keeping the belts tight, substantially as described and for the purpose set forth.

In witness whereof, I have hereunto signed my name in the presence of two subscribing witnesses.

BENGT ADAM AFZELIUS.

Witnesses:
 AXEL EHRNER.
 GRETA PRICUS.